(12) United States Patent
Xie et al.

(10) Patent No.: US 11,876,439 B2
(45) Date of Patent: Jan. 16, 2024

(54) MITIGATION OF BATTERY OUTPUT VOLTAGE RIPPLE UNDER PULSE LOAD

(71) Applicant: Apple Inc., Cupertino, CA (US)

(72) Inventors: Yanhui Xie, Santa Clara, CA (US); Asif Hussain, Clearwater, FL (US); Jingdong Chen, San Jose, CA (US); Zhiyuan Hu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 17/450,910

(22) Filed: Oct. 14, 2021

(65) Prior Publication Data
US 2022/0224219 A1 Jul. 14, 2022

Related U.S. Application Data

(60) Provisional application No. 63/137,485, filed on Jan. 14, 2021.

(51) Int. Cl.
*H02M 1/14* (2006.01)
*H02M 1/00* (2006.01)
*H02M 3/04* (2006.01)

(52) U.S. Cl.
CPC ........... *H02M 1/14* (2013.01); *H02M 1/0077* (2021.05); *H02M 3/04* (2013.01)

(58) Field of Classification Search
CPC ........ H02M 1/14; H02M 1/0077; H02M 3/04; H02M 1/0067; H02M 1/007; H02M 1/0074
See application file for complete search history.

(56) References Cited

U.S. PATENT DOCUMENTS

| | | |
|---|---|---|
| 5,682,303 A | 10/1997 | Goad |
| 6,118,254 A | 9/2000 | Faulk |
| 7,719,866 B2 | 5/2010 | Boldo |
| 8,575,896 B2 | 11/2013 | Greening et al. |
| 9,806,523 B2 | 10/2017 | Stratakos et al. |
| 10,109,888 B2 | 10/2018 | Scheucher |
| 10,326,284 B2 | 6/2019 | Long et al. |
| 10,431,147 B2 | 10/2019 | Park |
| 10,476,288 B2 | 11/2019 | Sultenfuss et al. |
| 10,483,863 B2 | 11/2019 | Kikuchi |
| 2004/0174147 A1 | 9/2004 | Vinciarelli |
| 2005/0105229 A1 | 5/2005 | Deng et al. |
| 2005/0185429 A1 | 8/2005 | Vinciarelli |
| 2010/0201200 A1* | 8/2010 | Hori ........................ H02J 1/08 307/82 |

(Continued)

*Primary Examiner* — Adolf D Berhane
(74) *Attorney, Agent, or Firm* — FLETCHER YODER PC

(57) ABSTRACT

A battery powered electronic device can include a battery to power one or more loads, a first DC-DC converter having an input coupled to the battery and an output, and a second DC-DC converter cascaded with the first DC-DC converter and coupled to a second load subject to pulsed operation. The first and second converters may be configured so as to isolate the one or more loads from transients associated with the pulsed operation of the second load. The second converter may have an input coupled to the output of the first converter and an output coupled to the second load. Alternatively, the second converter may be a bidirectional converter having first terminals coupled to the output of the first converter and second terminals coupled to an energy storage device.

21 Claims, 3 Drawing Sheets

(56) References Cited

U.S. PATENT DOCUMENTS

| | | | |
|---|---|---|---|
| 2010/0231178 A1* | 9/2010 | Handa | H02J 7/34 |
| | | | 320/163 |
| 2011/0038189 A1* | 2/2011 | Whittam | H02M 7/217 |
| | | | 363/84 |
| 2015/0365003 A1 | 12/2015 | Sadwick | |
| 2019/0190400 A1 | 6/2019 | Vanderzaden | |
| 2019/0379293 A1 | 12/2019 | Kannan et al. | |
| 2022/0416700 A1* | 12/2022 | Gehret | H02J 3/381 |

* cited by examiner

MITIGATION OF BATTERY OUTPUT VOLTAGE RIPPLE UNDER PULSE LOAD

CROSS-REFERENCE TO RELATED APPLICATIONS

This application claims priority to U.S. Provisional Application No. 63/137,485, filed Jan. 14, 2021, entitled "Mitigation of Battery Output Voltage Ripple Under Pulse Load," the disclosure of which is incorporated by reference in its entirety for all purposes.

BACKGROUND

Battery powered electronic devices may take a variety of forms, such as a smartphone, tablet computer, laptop computer, smart watch, etc. Such devices may include various electronic subsystems, including processing subsystems, communication subsystems, display sub systems, etc. Such devices may be powered by a battery. One or more loads corresponding to one or more of the various subsystems may be subject to intermittent current draws having relatively short rise and fall times and varying pulse widths and amplitudes. The intermittent load changes may result in voltage transients appearing across the main/battery bus that may cause various undesirable effects. As one example, ceramic capacitors may be used for energy storage in relatively small and thin portable devices. If the load current changes take place in the audio range of frequencies, such ceramic capacitors may experience mechanical resonance that leads to undesirable audible noise. In other cases, the magnitude of the voltage changes may cause undesirable disruption to other loads or may require more complex, expensive, and/or space-consuming regulators to be provided to protect such other loads from these transients.

SUMMARY

Thus, what is needed in the art are improved power system designs for battery powered electronic devices that can be used to mitigate battery output voltage ripple caused by pulsed loads within the device.

A battery powered electronic device can include a power bus configured to receive power from a battery, one or more loads connected to the power bus, a first DC-DC converter having an input coupled to the power bus and an output, and a second DC-DC converter cascaded with the first DC-DC converter and coupled to a second load, wherein the second load experiences pulsed operation. The second DC-DC converter may have a higher bandwidth than the first DC-DC converter so as to isolate the one or more loads from transients associated with the pulsed operation of the second load. The second DC-DC converter may have an input coupled to the output of the first DC-DC converter and an output coupled to the second load. The second DC-DC converter may be a bidirectional converter having first terminals coupled to the output of the first DC-DC converter and second terminals coupled to an energy storage capacitor, wherein the second load is coupled to the first terminals of the second DC-DC converter. The second DC-DC converter may be a bidirectional buck-boost converter. The second DC-DC converter may be a bidirectional charge pump. The second load may be a part of a display subsystem of the battery powered electronic device, a part of a processing subsystem of the battery powered electronic device, or a part of a communication subsystem of the battery powered electronic device. The bandwidth of the second DC-DC converter may be between 10x and 100x higher than the bandwidth of the first DC-DC converter.

A battery powered electronic device can include a battery, one or more loads coupled to and configured to draw power from the battery, a first DC-DC converter having an input coupled to the battery and an output, and a second DC-DC converter cascaded with the first DC-DC converter having an input coupled to the output of the first DC-DC converter and an output coupled to a second load, wherein the second load experiences pulsed operation. The first and second DC-DC converters may be configured so that the first DC-DC converter supplies an average power requirement of the second load and the second bidirectional DC-DC converter supplies a transient energy requirement of the second load. The first DC-DC converter may be a boost converter. The second load may be a part of a display subsystem of the battery powered electronic device, a part of a processing subsystem of the battery powered electronic device, or a part of a communication subsystem of the battery powered electronic device. The bandwidth of the second DC-DC converter may be between 10x and 100x higher than the bandwidth of the first DC-DC converter.

A battery powered electronic device can include a battery, one or more loads coupled to and configured to draw power from the battery, a first DC-DC converter having an input coupled to the battery and an output, an a second bidirectional DC-DC converter cascaded with the first DC-DC converter having a first terminal coupled to the output of the first DC-DC converter and a second terminal coupled to an energy storage device, and a second load coupled to the output of the first DC-DC converter, wherein the second load experiences pulsed operation.

The first and second DC-DC converters may be configured so that the first DC-DC converter supplies an average power requirement of the second load and the second bidirectional DC-DC converter supplies a transient energy requirement of the second load. The second DC-DC converter may supply the transient energy requirement of the second load from the energy storage device. The second load may be a part of a display subsystem of the battery powered electronic device, a part of a processing subsystem of the battery powered electronic device, or a part of a communication subsystem of the battery powered electronic device. The bandwidth of the second DC-DC converter may be between 10x and 100x higher than the bandwidth of the first DC-DC converter.

DETAILED DESCRIPTION

Figure 1:
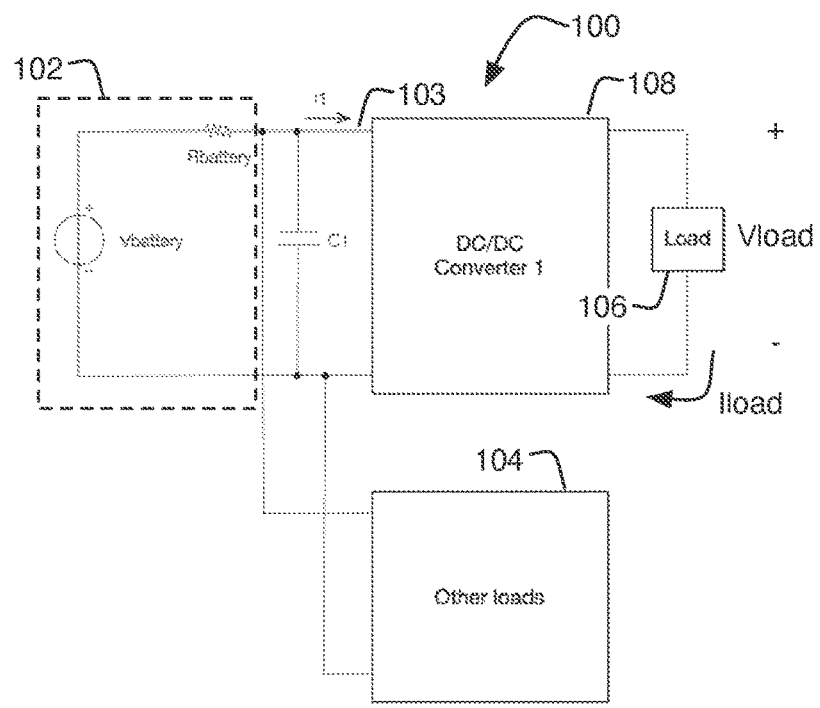
FIG. 1 illustrates a high level block diagram of the power system of a battery powered electronic device.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a high-level block diagram of a battery powered electronic device 100. Battery powered electronic device 100 may take a variety of forms, such as a smartphone, tablet computer, laptop computer, smart watch, etc. Such devices may include various electronic subsystems, such as processing subsystems, communication subsystems, display subsystems, etc. The processing subsystems may include various embodiments of processing devices, such as central processing units (CPUs), graphics processing units (GPUs), neural processing units (NPUs), as well as ancillary components to support these devices such as memory (e.g., random access memory/RAM) and storage (e.g., flash memory, etc.) The communication subsystems may include various embodiments of wired and/or wireless communication systems, including external ports for wired communication via USB, Ethernet, or other wired communication technologies as well as radio modules and associated processing systems for implementing various wireless communication techniques, such as WiFi, Bluetooth, NFC communications, and the like. The display subsystem may include various display elements for providing visual information to a user, such as an LCD, OLED, or other display technology. Electronic device 100 may include other systems as well, including I/O subsystems for touch-sensing, etc.

Electronic device 100 may be powered by a battery 102, which may be represented by its Thevenin equivalent including voltage source Vbattery and series resistance Rbattery. Battery 102 provides power to a power bus 103, which may deliver a load current I1 to a load 106 via a first DC-DC converter 108. DC-DC converter 108 may be any suitable converter type for converting the battery voltage to an appropriate level for load 106. For example, if load 106 requires a higher voltage than the battery voltage, DC-DC converter may be a boost converter. Alternatively, if load 106 requires a lower voltage than the battery voltage, DC-DC converter may be a buck converter. Charge pumps, buck-boost converters, and other converter types may also be used in a given embodiment, depending on the particular requirements, objectives, and constraints of the system. Power bus 103 may be supported by a capacitor C1, which can provide some amount of energy storage allowing the bus voltage to remain relatively stable in the presence of transients associated with changes in operating current of the various loads. Power bus 103 may also deliver power to other loads 104 (which may be powered directly by bus 103 or which may have their own intervening DC-DC converters (not shown).

Figure 2:
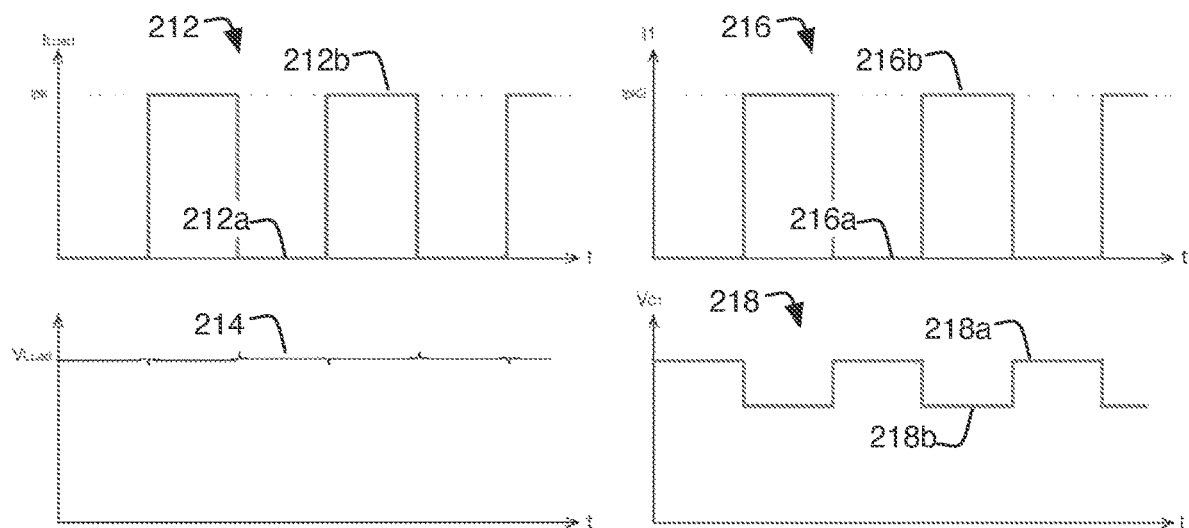
FIG. 2 illustrates various voltage and current waveform of the device of FIG. 1.

Load 106 may be a load that experiences intermittent current draws, as illustrated by curve 212 in FIG. 2, in which the load current alternates between a small or even zero value 212a and a peak value 212b. The rise and fall times of the current may be relatively short, and the pulse width and pulse amplitude may vary from cycle to cycle. In some cases, this change in load current may be relatively large. An example of such a load may be a backlight for an LED display, which draws a relatively higher current when the display is on but draws little or no current when the display is off (which is typical in many portable devices, such as smart phones, tablet computers, smartwatches, etc.).

In another embodiment, such a load might be one or the processing system components, such as a CPU or GPU, that alternates between lower power draw states when there is little processing activity and higher power draw states when there is significant processing activity or a communication system component in which case the radios draw relatively higher power when transmitting versus relatively lower power when not transmitting. In the case of a display, the frequency of the load changes illustrated in plot 212 will be relatively low. For instance, even if the backlight is intermittently powered off in synchronization with the display refresh cycles, such operations may take place at a frequency on the order of 60 Hz to 120 Hz. (Higher, lower, or intermediate display refresh rates, such as 30 Hz, 75 Hz, 90 Hz, 240 Hz, etc.) could also be used. Conversely, in the case of a processing system or communication system, the frequency of the load changes may be substantially higher, in the kilohertz, megahertz, or even gigahertz range.

The intermittent load current changes 212 associated with load 106 may result in voltage transients illustrated in plot 214 of FIG. 2, which illustrates the load voltage Vload. DC-DC converter 108 may be designed so as to provide a suitably regulated output voltage Vload in the presence of the expected current transients 212. However, the intermittent load changes of load 106 may also cause transients to occur on the input side of DC-DC converter 108, i.e., on bus 103. Such transients are illustrated in plot 216 (current transients) and plot 218 (voltage transients). The current transients correspond to current I1, which is the input converter into DC-DC converter 108. The voltage transients correspond to voltage VC1, which is the voltage across the capacitor C1. This voltage is also the voltage that is supplied to other loads 104 (corresponding to others of the various systems discussed above).

More specifically, an increase in load current to the peak current level 212b may result in a corresponding increase in bus/input current I1 to a corresponding level 216b. This increased current, being drawn from battery 102 and therefore flowing through the battery's series resistance Rbattery, may result in a corresponding voltage dip to a level 218b. Conversely, when the load current drops to lower level 212a, there will be a corresponding decrease in the input/bus current I1 corresponding to level 216a and a corresponding increase of the bus/capacitor C1 voltage to a level 218a.

The aforementioned changes in the bus voltage may cause various undesirable effects. As one example, in relatively small and thin portable devices, capacitor C1 may be implemented as a ceramic capacitor. In the case that load 106 is a display subsystem or other subsystem in which the load current changes take place in the audio range of frequencies, such ceramic capacitors may experience mechanical resonance that leads to undesirable audible noise. In other cases, the magnitude of the voltage changes may cause undesirable disruption to other loads 104 or may require more complex, expensive, and/or space-consuming regulators to be provided to protect such other loads from these transients.

Figure 3:
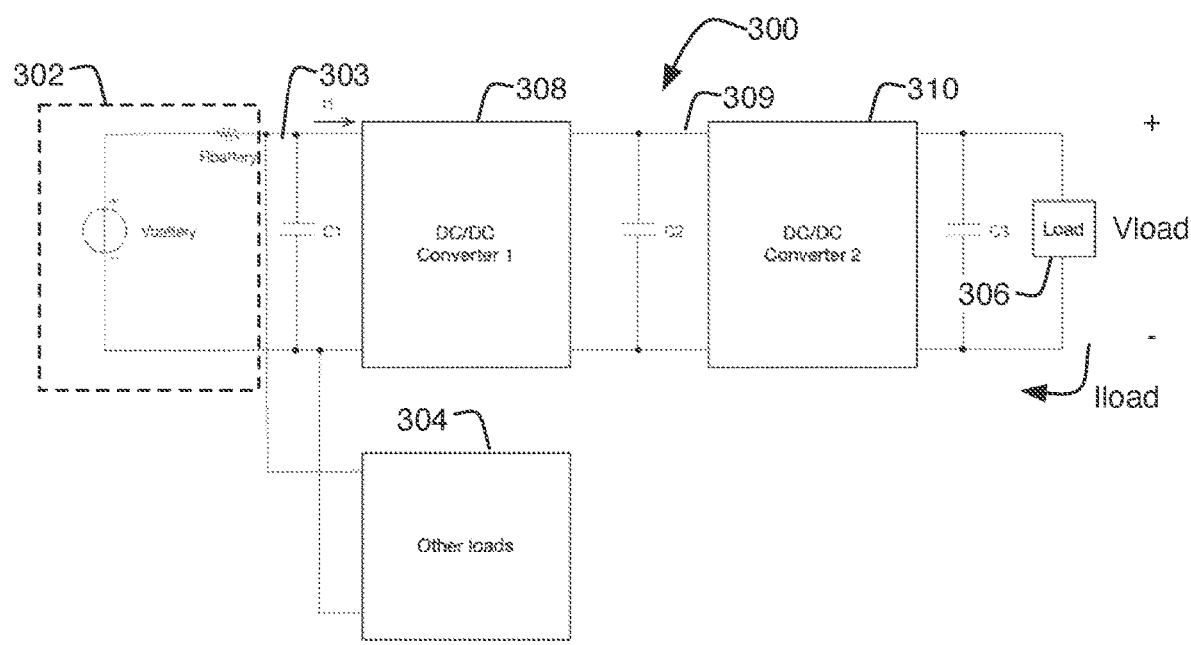
FIG. 3 illustrates a high-level block diagram of the power system of an improved battery powered electronic device including a first and second DC-DC converters configured to mitigate battery output voltage ripple in response to a pulsed load.

FIG. 3 illustrates an improved battery powered electronic device 300. The components of FIG. 3 are numbered with like reference numbers to FIG. 1. Electronic device 300 may be powered by a battery 302, which may be represented by its Thevenin equivalent including voltage source Vbattery and series resistance Rbattery. Battery 302 provides power to a power bus 303, which may deliver a load current I1 to a load 306 via a first DC-DC converter 308 and a second converter 310, discussed in greater detail below. Power bus 303 may be supported by a capacitor C1, which can provide some amount of energy storage allowing the bus voltage to remain relatively stable in the presence of transients associated with changes in operating current of the various loads. Power bus 303 may also deliver power to other loads 304, which may be powered directly by bus 303 or which may have their own intervening DC-DC converters (not shown).

Rather than directly powering load 306, DC-DC converter 308 may power an intermediate bus 309, supported by a capacitor C2. This intermediate bus 309 may then power a second DC-DC converter 310, that can power load 306 via its output bus, which may also be supported by a capacitor C3. As above, load 306 may be a load that experiences intermittent current draws, as illustrated by curve 412 in FIG. 4, in which the load current alternates between a small or even zero value 412a and a peak value 412b. The intermittent load current changes 412 associated with load 106 may result in voltage transients illustrated in plot 414 of FIG. 4, which illustrates the load voltage Vload. DC-DC converter 310 may be designed so as to provide a suitably regulated output voltage Vload in the presence of the expected current transients 412. This may correspond to a relatively "fast" converter controller, i.e., one with a relatively high bandwidth. DC-DC converter 308 may then be configured with a relatively "slower" controller, i.e., one with a relatively lower bandwidth so as to prevent large transients from appearing on bus 303. For example, in some embodiments, DC-DC converter 308 may be designed with a controller bandwidth that is 1/10 as fast or even 1/100 as fast as DC-DC converter 310. In other words, DC-DC converter 310 may be 10× to 100× faster than DC-DC converter 308. The net result of such a configuration is that DC-DC converter 308 ends up supplying the "average" requirement of load 306, while DC-DC converter 310 meets the transient demands of load 306, with intermediate bus 309/capacitor C2 being used to store the energy needed for DC-DC converter 310 to meet the transient demand.

Figure 4:
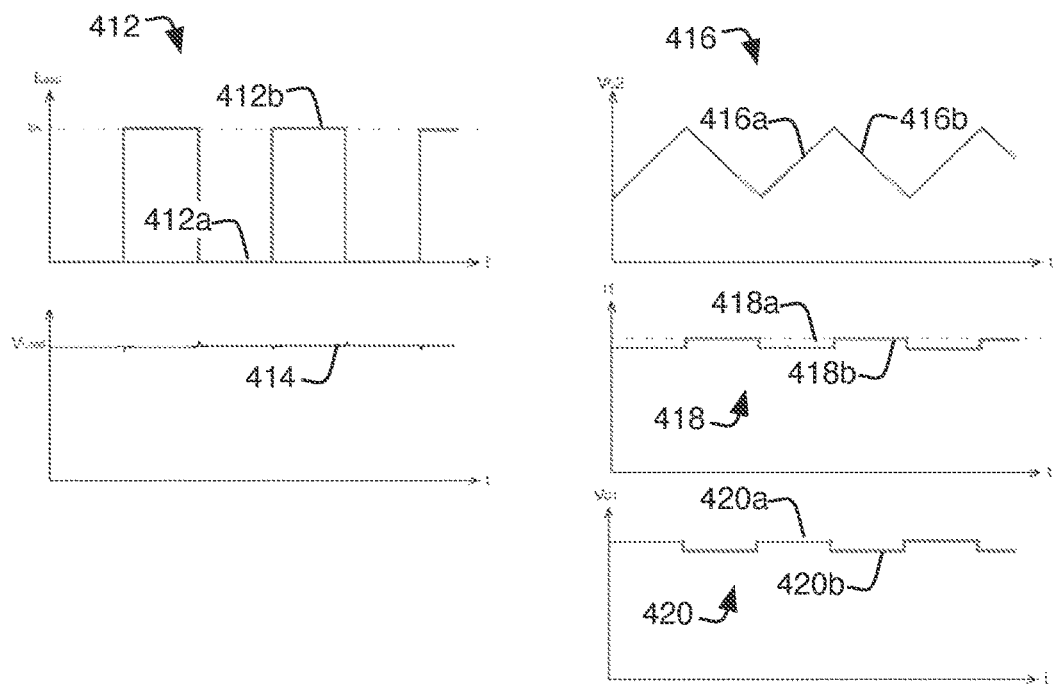
FIG. 4 illustrates various voltage and current waveforms of the device of FIG. 3.

Thus, as can be seen with reference to curve 416, FIG. 4, voltage of intermediate bus 309, which corresponds to the voltage across capacitor VC2 increases 416a during time periods in which load 306 is in its low current mode 412a and decreases 416b during time periods in which load 306 is in its higher current state 412b. As before, the intermittent load changes of load 306 may also cause transients to occur on the input side of DC-DC converter 308, i.e., on bus 303; however, the interposition of cascaded DC-DC converter 310 can significantly reduce the magnitude of these transients. Such transients are illustrated in plot 418 (current transients) and plot 420 (voltage transients). The current transients correspond to current I1, which is the input converter into DC-DC converter 308. The voltage transients correspond to voltage VC1, which is the voltage across the capacitor C1. This voltage is also the voltage that is supplied to other loads 304 (corresponding to others of the various systems discussed above).

More specifically, an increase in load current to the peak current level 412b may result in a corresponding increase in bus/input current I1 to a corresponding level 418b. This increased current, being drawn from battery 302 and therefore flowing through the battery's series resistance Rbattery, may result in a corresponding voltage dip to a level 420b. Conversely, when the load current drops to lower level 412a, there will be a corresponding decrease in the input/bus current I1 corresponding to level 416a and a corresponding increase of the bus/capacitor C1 voltage to a level 420a. As can be seen by comparison to FIG. 2, the transients appearing on main bus 303 can be substantially smaller than corresponding transients appearing on main bus 103.

Figure 5:
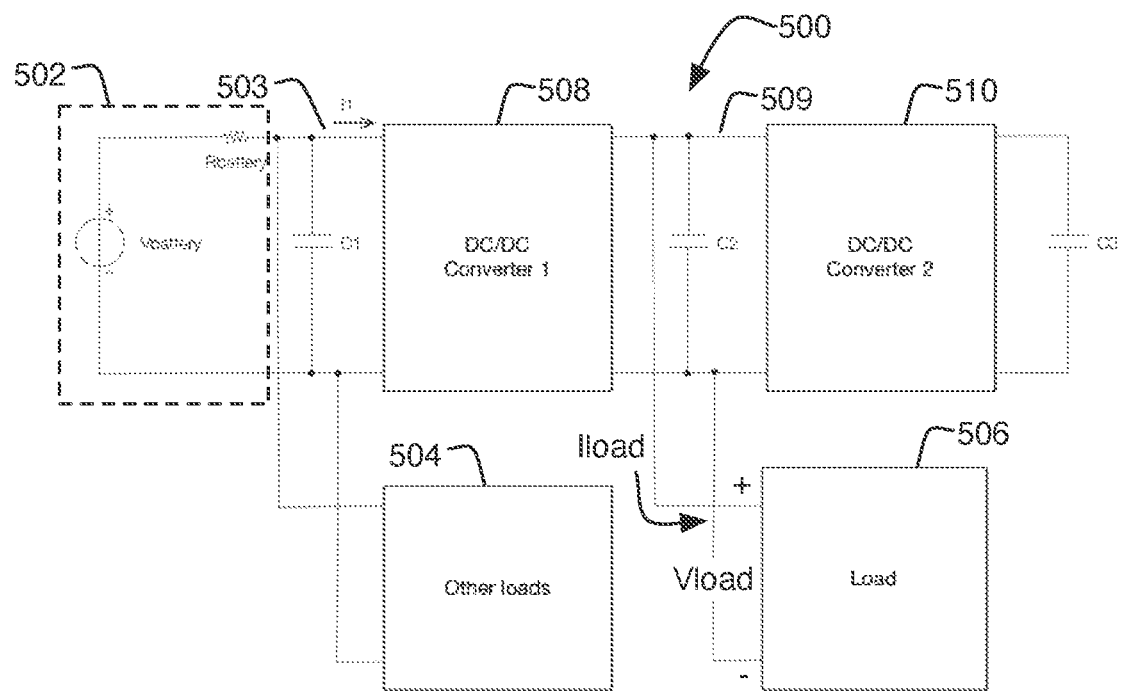
FIG. 5 illustrates a high-level block diagram of the power system of an alternative improved battery powered electronic device including a first and second DC-DC converters configured to mitigate battery output voltage ripple in response to a pulsed load.

FIG. 5 illustrates an alternative improved battery powered electronic device 500. The components of FIG. 5 are numbered with like reference numbers to FIGS. 1 and 3. Electronic device 500 may be powered by a battery 502, which may be represented by its Thevenin equivalent including voltage source Vbattery and series resistance Rbattery. Battery 502 provides power to a power bus 503, which may deliver a load current I1 to a load 506 via a first DC-DC converter 508. A second converter 310 may also be provided, as discussed in greater detail below. Power bus 503 may be supported by a capacitor C1, which can provide some amount of energy storage allowing the bus voltage to remain relatively stable in the presence of transients associated with changes in operating current of the various loads. Power bus 503 may also deliver power to other loads 504, which may be powered directly by bus 503 or which may have their own intervening DC-DC converters (not shown).

In addition to directly powering load 506, DC-DC converter 508 may power an intermediate bus 509, supported by a capacitor C2. This intermediate bus 509 may then power a second DC-DC converter 510, that can store energy in or retrieve energy from an energy storage capacitor C3. To that end, DC-DC converter may be a bidirectional converter of any suitable topology, such as a bidirectional buck-boost converter or a bidirectional charge pump. As above, load 506 may be a load that experiences intermittent current draws, as illustrated by curve 612 in FIG. 6, in which the load current alternates between a small or even zero value 612a and a peak value 612b. The intermittent load current changes 612 associated with load 506 may result in voltage transients illustrated in plot 614 of FIG. 6, which illustrates the load voltage Vload. DC-DC converters 508 and 510 may be designed so as to, in combination, provide a suitably regulated output voltage Vload in the presence of the expected current transients 612. This may include DC-DC converter 508 being a relatively "slower" converter, with a corresponding, slower converter controller, and DC-DC converter 510 being a relatively "faster" converter with a relatively faster controller, i.e., one with a relatively high bandwidth. For example, in some embodiments, DC-DC converter 508 may be designed with a controller bandwidth that is 1/10 as fast or even 1/100 as fast as DC-DC converter 510. In other words, DC-DC converter 510 may be 10× to 100× faster than DC-DC converter 508. The net result of such a configuration is that, similarly to the arrangement of FIG. 4 discussed above, DC-DC converter 508 ends up supplying the "average" requirement of load 506, while DC-DC converter 510 meets the transient demands of load 506, with capacitor C3 being used to store the energy needed for DC-DC converter 510 to meet the transient demand.

Figure 6:
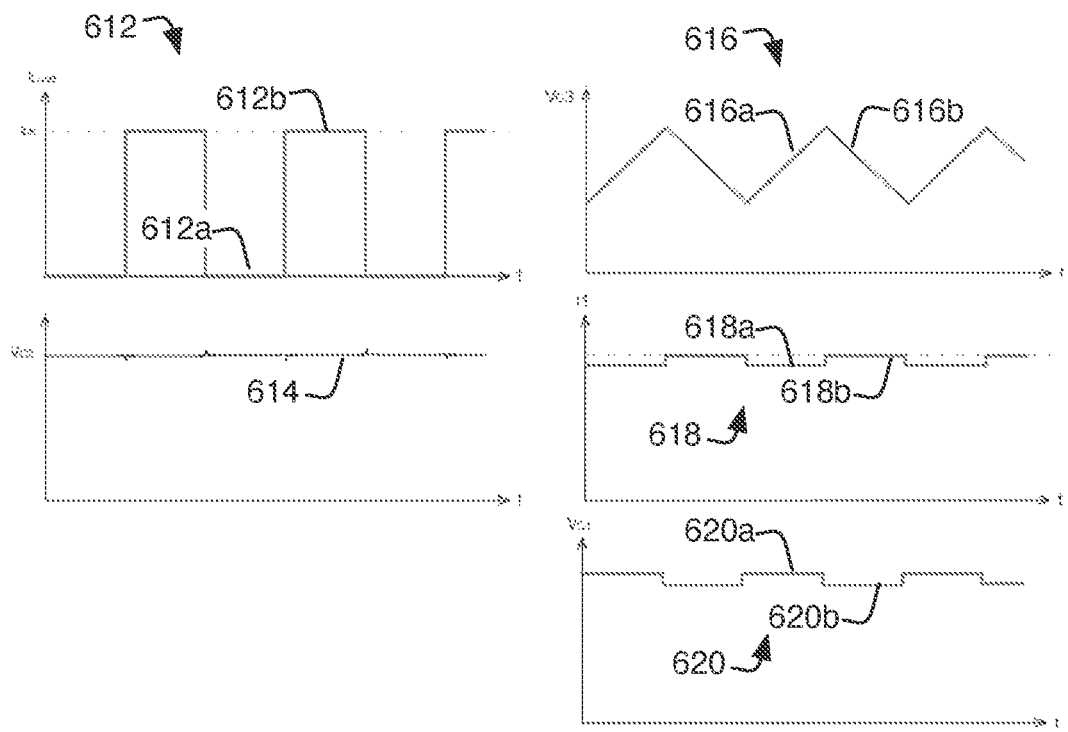
FIG. 6 illustrates various voltage and current waveforms of the device of FIG. 5.

Thus, as can be seen with reference to curve 616, FIG. 6, the across of capacitor C3 (and thus the energy stored therein) increases 616a during time periods in which load 506 is in its low current mode 612a and decreases 616b during time periods in which load 506 is in its higher current state 612b. As before, the intermittent load changes of load 506 may also cause transients to occur on the input side of DC-DC converter 508, i.e., on bus 503; however, the addition of DC-DC converter 510 (and its associated energy storage capacitor C3) can significantly reduce the magnitude of these transients. Such transients are illustrated in plot 618 (current transients) and plot 620 (voltage transients). The current transients correspond to current I1, which is the input converter into DC-DC converter 508. The voltage transients correspond to voltage VC1, which is the voltage across the capacitor C1. This voltage is also the voltage that is supplied to other loads 504 (corresponding to others of the various systems discussed above).

More specifically, an increase in load current to the peak current level 612b may result in a corresponding increase in bus/input current I1 to a corresponding level 618b. This increased current, being drawn from battery 502 and therefore flowing through the battery's series resistance Rbattery, may result in a corresponding voltage dip to a level 620b. Conversely, when the load current drops to lower level 612a, there will be a corresponding decrease in the input/bus current I1 corresponding to level 616a and a corresponding increase of the bus/capacitor C1 voltage to a level 620a. As can be seen by comparison to FIG. 2, the transients appearing on main bus 503 can be substantially smaller than corresponding transients appearing on main bus 103.

In each of the embodiments above, the reduction of transient voltages appearing on the bus directly supplied by the battery is accomplished by the presence of a second DC-DC converter that responds to load transients more quickly than the "main" DC-DC converter. As discussed above, for at least some applications, a bandwidth of the faster converter may be 10× to 100× the bandwidth of the slower converter. The faster converter may respond to these transients using energy stored in the mechanism of the converter itself and/or one or more additional energy storage components, such as additional capacitors. The net result is that the slower converter can supply the average power requirement of the load, with the faster converter supplying the transient requirements. Because of its slower response, the "main" converter may not provide as precise a degree of regulation as might otherwise be desired, however, the presence of the second, faster converter can make up for this deficit, allowing for the high draw load to still be sufficiently precisely regulated.

Such arrangements may be particularly advantageous when used in conjunction with battery powered portable electronic devices and in particular with high draw, relatively low frequency subsystems of such devices, such as display subsystems. In these cases, it may be impractical to provide other energy storage mechanisms, such as larger capacitors, suitable to meet the required transient performance due to space constraints. Likewise, because they operate at lower frequencies, the energy storage requirements are higher, resulting in much larger energy storage components (e.g., capacitors or inductors), which, again, may run afoul of the space constraints for a given application.

Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A battery powered electronic device comprising:
a power bus configured to receive power from a battery;
one or more loads connected to the power bus;
a first DC-DC converter having an input coupled to the power bus and an output; and
a second DC-DC converter cascaded with the first DC-DC converter and coupled to a second load, wherein the second load experiences pulsed operation;
wherein the second DC-DC converter has a higher bandwidth than the first DC-DC converter so as to isolate the one or more loads from transients associated with the pulsed operation of the second load.

2. The battery powered electronic device of claim 1 wherein the second DC-DC converter has an input coupled to the output of the first DC-DC converter and an output coupled to the second load.

3. The battery powered electronic device of claim 1 wherein the second DC-DC converter is a bidirectional converter having first terminals coupled to the output of the first DC-DC converter and second terminals coupled to an energy storage capacitor, wherein the second load is coupled to the first terminals of the second DC-DC converter.

4. The battery powered electronic device of claim 3 wherein the second DC-DC converter is a bidirectional buck-boost converter.

5. The battery powered electronic device of claim 3 wherein the second DC-DC converter is a bidirectional charge pump.

6. The battery powered electronic device of claim 1 wherein the second load is a part of a display subsystem of the battery powered electronic device.

7. The battery powered electronic device of claim 1 wherein the second load is a part of a processing subsystem of the battery powered electronic device.

8. The battery powered electronic device of claim 1 wherein the second load is part of a communication subsystem of the battery powered electronic device.

9. The battery powered electronic device of claim 1 wherein the bandwidth of the second DC-DC converter is between 10× and 100× higher than the bandwidth of the first DC-DC converter.

10. A battery powered electronic device comprising:
a battery;
one or more loads coupled to and configured to draw power from the battery;
a first DC-DC converter having an input coupled to the battery and an output; and
a second DC-DC converter cascaded with the first DC-DC converter having an input coupled to the output of the first DC-DC converter and an output coupled to a second load, wherein the second load experiences pulsed operation;
wherein first and second DC-DC converters are configured so that the first DC-DC converter supplies an average power requirement of the second load and the second DC-DC converter supplies a transient energy requirement of the second load.

11. The battery powered electronic device of claim 10 wherein the first DC-DC converter is a boost converter.

12. The battery powered electronic device of claim 10 wherein the second load is a part of a display subsystem of the battery powered electronic device.

13. The battery powered electronic device of claim 10 wherein the second load is a part of a processing subsystem of the battery powered electronic device.

14. The battery powered electronic device of claim 10 wherein the second load is part of a communication subsystem of the battery powered electronic device.

15. The battery powered electronic device of claim 10 wherein the bandwidth of the second DC-DC converter is between 10× and 100× higher than the bandwidth of the first DC-DC converter.

16. A battery powered electronic device comprising:
a battery;
one or more loads coupled to and configured to draw power from the battery;
a first DC-DC converter having an input coupled to the battery and an output;
a second DC-DC converter, wherein the second DC-DC converter is a bidirectional DC-DC converter and is cascaded with the first DC-DC converter having a first terminal coupled to the output of the first DC-DC converter and a second terminal coupled to an energy storage device; and
a second load coupled to the output of the first DC-DC converter, wherein the second load experiences pulsed operation;
wherein first and second DC-DC converters are configured so that the first DC-DC converter supplies an average power requirement of the second load and the second bidirectional DC-DC converter supplies a transient energy requirement of the second load.

17. The battery powered electronic device of claim 16 wherein the second DC-DC converter supplies the transient energy requirement of the second load from the energy storage device.

18. The battery powered electronic device of claim 16 wherein the second load is a part of a display subsystem of the battery powered electronic device.

19. The battery powered electronic device of claim 16 wherein the second load is a part of a processing subsystem of the battery powered electronic device.

20. The battery powered electronic device of claim 16 wherein the second load is part of a communication subsystem of the battery powered electronic device.

21. The battery powered electronic device of claim 16 wherein the bandwidth of the second DC-DC converter is between 10x and 100x higher than the bandwidth of the first DC-DC converter.

* * * * *